US012794328B2

(12) United States Patent
Takahashi et al.

(10) Patent No.: US 12,794,328 B2
(45) Date of Patent: Nov. 10, 2026

(54) MANUFACTURING APPARATUS FOR ARMATURE

(71) Applicant: TOYOTA BOSHOKU KABUSHIKI KAISHA, Aichi-ken (JP)

(72) Inventors: Atsushi Takahashi, Toyota (JP); Yuki Wakimoto, Nagoya (JP); Nobuhiro Kamiya, Handa (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 73 days.

(21) Appl. No.: 18/928,850

(22) Filed: Oct. 28, 2024

(65) Prior Publication Data

US 2025/0149958 A1 May 8, 2025

(30) Foreign Application Priority Data

Nov. 6, 2023 (JP) ................................ 2023-189386

(51) Int. Cl.
*H02K 15/12* (2025.01)
*H02K 15/03* (2025.01)

(52) U.S. Cl.
CPC ............ *H02K 15/12* (2013.01); *H02K 15/03* (2013.01); *H02K 2215/00* (2021.08)

(58) Field of Classification Search
CPC ....................................................... H02K 15/12
See application file for complete search history.

(56) References Cited

U.S. PATENT DOCUMENTS

2019/0363621 A1* 11/2019 Myojin .................... H02K 1/16
2022/0294322 A1* 9/2022 Hiramatsu ............. H02K 15/03

FOREIGN PATENT DOCUMENTS

JP 2019-140841 8/2019
JP 2019140842 A * 8/2019
WO WO-2015053368 A1 * 4/2015 ......... B29C 45/7653

* cited by examiner

*Primary Examiner* — Virak Nguon
(74) *Attorney, Agent, or Firm* — GREENBLUM & BERNSTEIN, P.L.C.

(57) ABSTRACT

A manufacturing apparatus for an armature includes a fixed die, a movable die that includes a sprue, and a stripper plate located between the movable die and the fixed die. The stripper plate defines a runner and a gate. The runner extends in a movement direction of the movable die and extends in a direction that is orthogonal to the movement direction. The stripper plate includes a first segment and a second segment that are divided in the movement direction. The stripper plate further includes a first biasing portion that biases the first segment and the second segment to move away from each other in the movement direction. The first segment defines the runner together with the movable die. The second segment defines the runner and the gate.

6 Claims, 7 Drawing Sheets

MANUFACTURING APPARATUS FOR ARMATURE

CROSS-REFERENCE TO RELATED APPLICATIONS

This application is based upon and claims the benefit of priority from prior Japanese Patent Application No. 2023-189386, filed on Nov. 6, 2023, the entire contents of which are incorporated herein by reference.

BACKGROUND

1. Field

The present disclosure relates to a manufacturing apparatus for an armature such as a rotor of a magnet-embedded motor.

2. Description of Related Art

The rotor of a magnet-embedded motor includes a core formed by stacking iron core pieces. The core includes magnet accommodating holes extending through the core in the stacking direction of the iron core pieces. A magnet is fixed in each of the magnet accommodating holes by filling the magnet accommodating hole with a resin material, with the magnet accommodated in the magnet accommodating hole.

Japanese Laid-Open Patent Publication No. 2019-140841 discloses a conventional manufacturing apparatus for such a rotor. The manufacturing apparatus for the rotor disclosed in the publication includes a first die and a second die that face each other with a core located therebetween. The first die includes a die body and a support member that supports the core. The second die includes a die body and a cull plate having filling pots for respectively filling the magnet accommodating hole with thermosetting resin materials.

To manufacture the rotor, the cull plate is first attached to the core which is supported by the support member and in which the magnet accommodating holes respectively accommodate magnets. After the core in this state is held between the die body of the first die and the die body of the second die, the magnets are fixed by respectively filling the magnet accommodating holes with thermosetting resin materials from the filling pots of the cull plate. The rotor is thus manufactured.

After manufacturing the rotor using the above-mentioned rotor manufacturing apparatus, the excess resin materials remaining in the filling pots of the cull plate are respectively connected to the resin materials filled in the magnet accommodating holes of the core. Thus, the cull plate needs to be separated from the rotor together with the excess resin materials. Consequently, there is an issue that an additional facility dedicated for separating the cull plate from the rotor needs be prepared.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A manufacturing apparatus for an armature according to an aspect of the present disclosure includes a fixed die, a movable die that opposes the fixed die and includes a sprue, and a stripper plate located between the movable die and the fixed die and configured to move relative to the movable die. The stripper plate defines a runner and a gate. The runner extends in a movement direction of the movable die and extends in a direction that is orthogonal to the movement direction. The manufacturing apparatus for the armature is configured to manufacture the armature by filling a magnet accommodating hole with a resin material to fix a magnet, in a state in which the fixed die and the movable die are clamped such that a core in which the magnet accommodating hole accommodates the magnet is held between the fixed die and the stripper plate. The stripper plate includes a first segment and a second segment that are divided in the movement direction and a first biasing portion that biases the first segment and the second segment to move away from each other in the movement direction. The first segment defines the runner together with the movable die. The second segment defines the runner and the gate.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment will now be described with reference to the drawings.

Rotor 11

Figure 1:
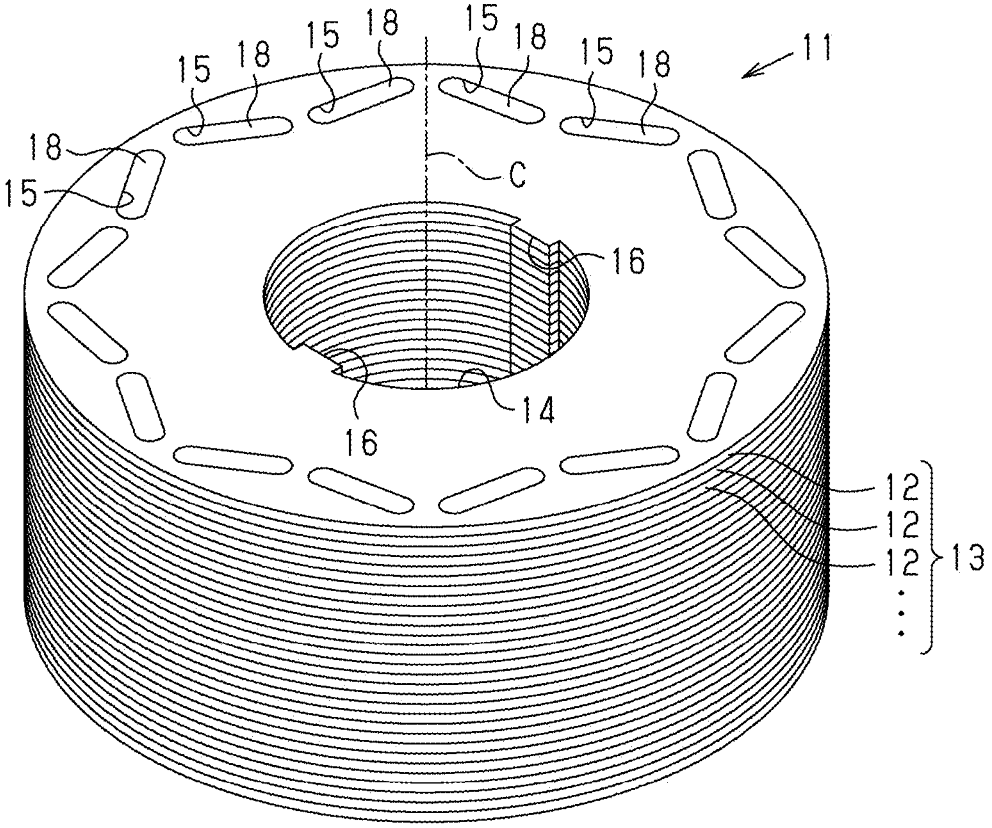
FIG. 1 is a perspective view of a rotor that is manufactured using a manufacturing apparatus according to an embodiment.
Figure 2:
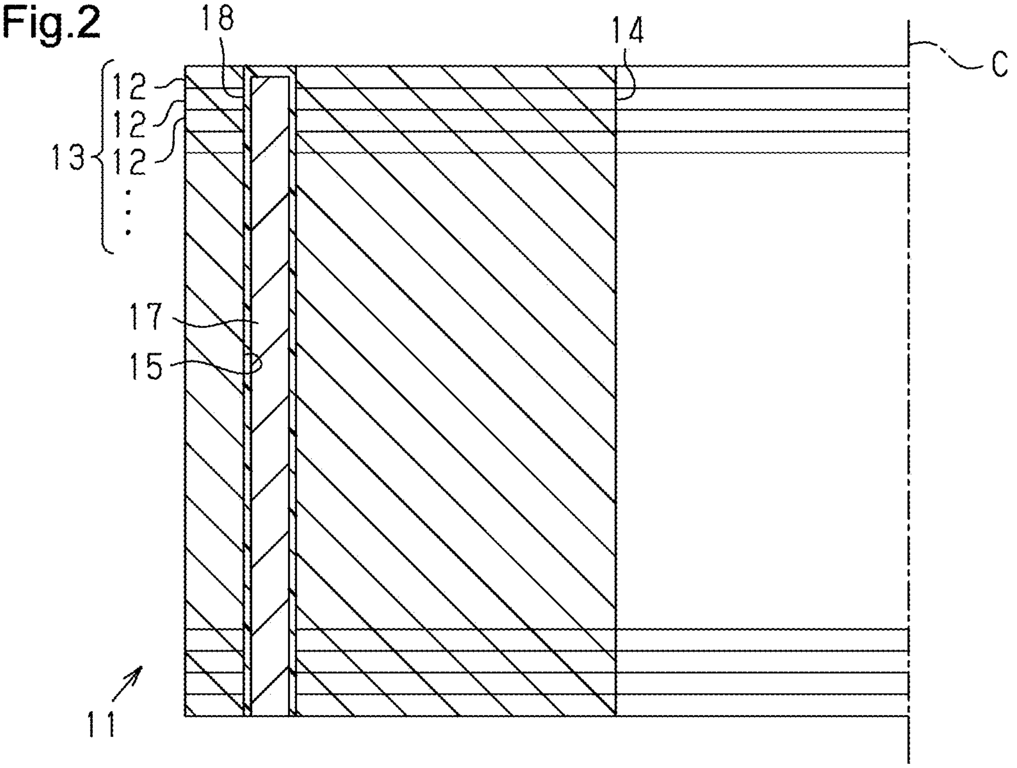
FIG. 2 is a cross-sectional view of the rotor shown in FIG. 1.

As shown in FIGS. 1 and 2, a rotor 11 as an example of an armature for a magnet-embedded motor includes a core 13. The core 13 is formed by stacking multiple iron core pieces 12, which are circular electrical steel sheets. That is, the core 13 is formed by a stack including stacked iron core pieces 12. The core 13 includes a central hole 14 and multiple (sixteen in the present embodiment) magnet accommodating holes 15. The magnet accommodating holes 15 are located on the outer circumferential side of the central hole 14 and arranged at intervals in the circumferential direction.

The central hole 14 and the magnet accommodating holes 15 extend through the core 13 in an extending direction of an axis C of the core 13 (axial direction). That is, the central hole 14 and the magnet accommodating holes 15 extend along the axis C of the core 13 while extending through the core 13. Two protrusions 16 that face each other in the radial direction of the core 13 are provided on the inner circumferential surface of the central hole 14. The protrusions 16 extend along the axis C. The shape of each magnet accommodating hole 15, as viewed in the extending direction of the axis C, is substantially rectangular with rounded opposite ends in the longitudinal direction.

Each magnet accommodating hole 15 accommodates a magnet 17 (permanent magnet) having a rectangular parallelepiped shape. Each magnet accommodating hole 15 is filled with a thermoplastic resin material 18 to fix the magnet 17. The resin material 18 is, for example, formed from polypropylene.

Manufacturing Apparatus 21 for Rotor 11.

Figure 3:
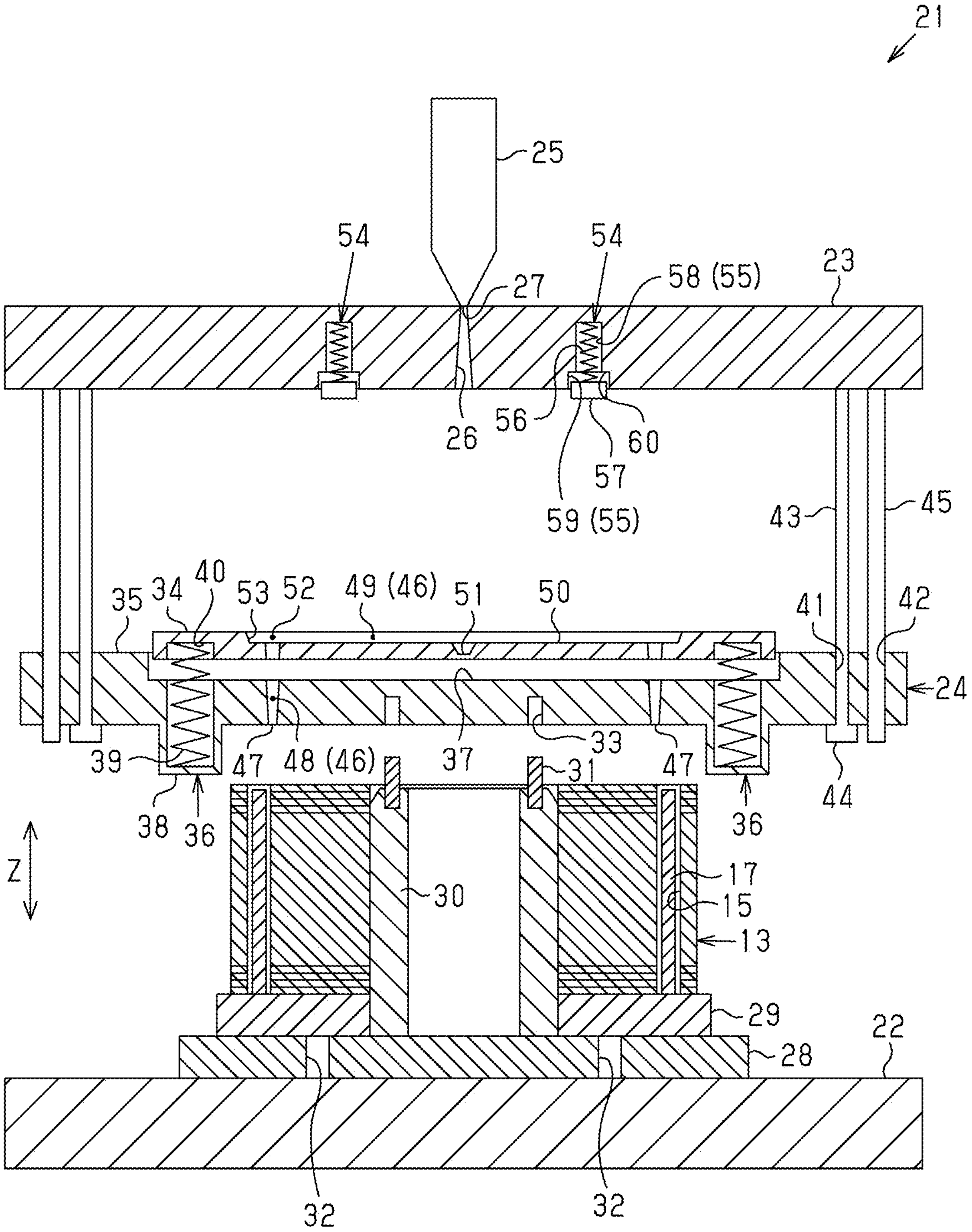
FIG. 3 is a cross-sectional view of the manufacturing apparatus in a state in which the fixed die and the movable die are open.
Figure 5:
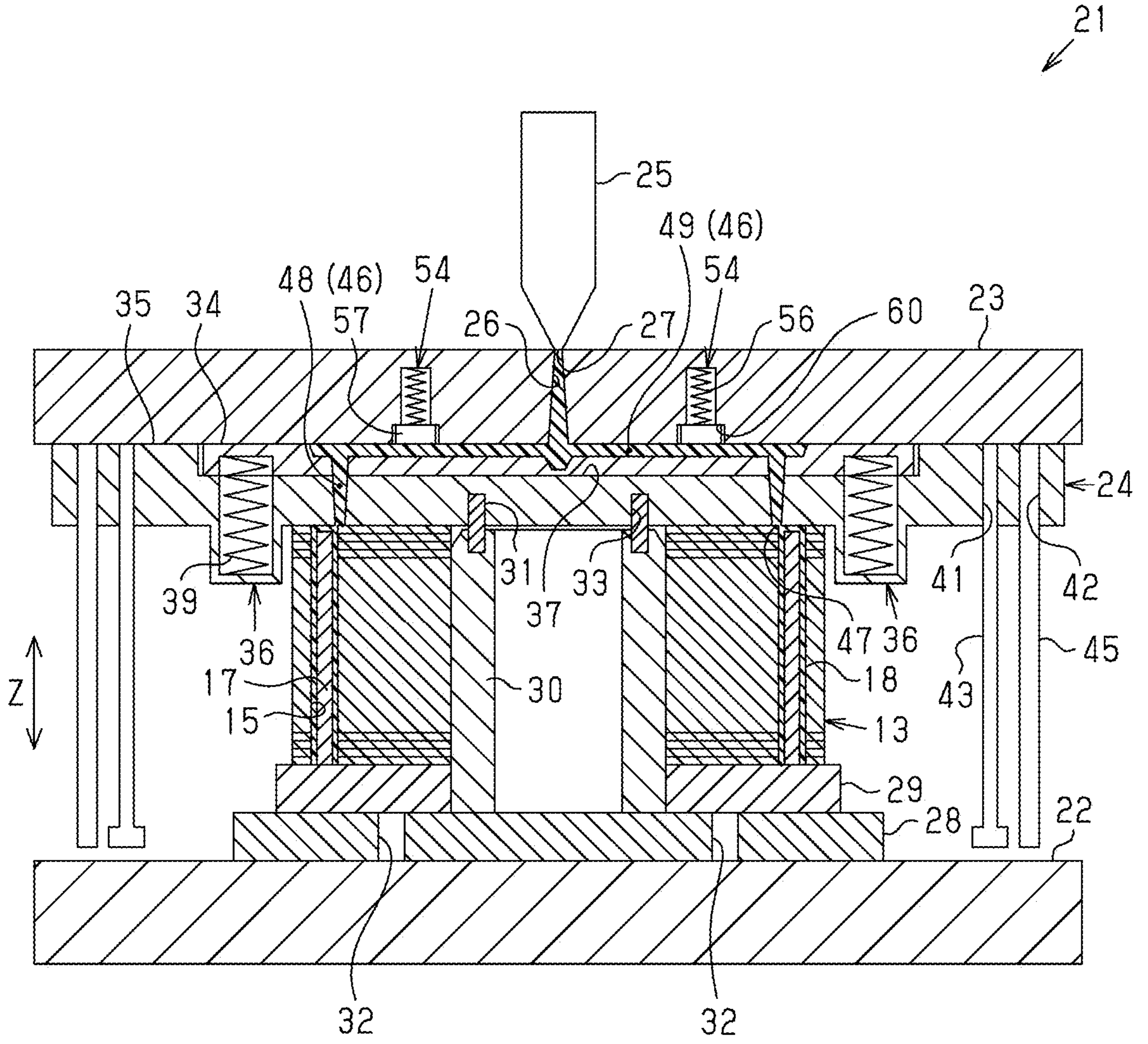
FIG. 5 is a cross-sectional view of the manufacturing apparatus in a state in which the fixed die and the movable die are clamped and the magnet accommodating holes of the core are respectively filled with the resin materials.

FIGS. 3 and 5 each show the manufacturing apparatus 21 for the rotor 11, as an example of the manufacturing device for the armature. The manufacturing apparatus 21 includes a fixed die 22, a movable die 23 that opposes the fixed die 22, and a stripper plate 24 arranged between the fixed die 22 and the movable die 23. The fixed die 22 and the movable die 23 face each other in a vertical direction Z. The fixed die 22 and the movable die 23 are positioned apart when the dies are open, as shown in FIG. 3, and move toward each other as the dies are clamped, as shown in FIG. 5.

Specifically, the movable die 23 moves away from the fixed die 22 in the vertical direction Z, in which the movable die 23 opposes the fixed die 22, when the dies are open as shown in FIG. 3. Further, the movable die 23 moves toward the fixed die 22 when the dies are clamped as shown in FIG. 5. The movement direction of the movable die 23 in the present embodiment coincides with the vertical direction Z.

In the manufacturing apparatus 21 for the rotor 11, the fixed die 22 and the movable die 23 are alternately opened and clamped as described above. The movable die 23 includes a cylinder 25 used to inject a molten resin material 18. The cylinder 25 has a heater (not shown) used to heat the resin material 18 to keep the resin material 18 molten.

The central part of the movable die 23 includes a sprue 26 extending in the vertical direction Z. The sprue 26 is tapered such that its diameter increases toward the bottom. The upper end of the sprue 26 is connected to a nozzle 27 of the cylinder 25.

The manufacturing apparatus 21 for the rotor 11 manufactures the rotor 11 by filling each magnet accommodating hole 15 with a corresponding resin material 18 to fix the magnet 17, in a state in which the fixed die 22 and the movable die 23 are clamped such that the core 13 in which the magnet accommodating hole 15 accommodates the magnet 17 is held between the fixed die 22 and the stripper plate 24.

In a state in which the fixed die 22 and the movable die 23 are open, with the axial direction coinciding with the vertical direction Z, the core 13 in which each magnet accommodating hole 15 has not been filled with a corresponding resin material 18 is located between the fixed die 22 and the stripper plate 24. Specifically, the core 13 in which each magnet 17 is accommodated in a corresponding magnet accommodating hole 15, is, together with an intermediate plate 28 and a spacer 29, located between the fixed die 22 and the stripper plate 24.

The intermediate plate 28 is used to convey the core 13 into the section between the fixed die 22 and the stripper plate 24 and convey the core 13 from the section between the fixed die 22 and the stripper plate 24. A cylindrical post 30 is fixed to the central part of the intermediate plate 28. The post 30 extends through the spacer 29 and the central hole 14 of the core 13. In this state, the spacer 29 is located between the intermediate plate 28 and the core 13. Pins 31 are provided at the tip of the post 30.

The spacer 29 and the core 13 have their relative positions fixed in the circumferential direction with respect to the post 30. The spacer 29 is used to extract the core 13 out of the post 30. That is, the spacer 29 is pressed away from the intermediate plate 28 by pins or the like (not shown) that are respectively configured to be passed through through-holes 32 in the intermediate plate 28. When the spacer 29 is pressed, the core 13 is also pressed, resulting in the core 13 being extracted out of the post 30.

Stripper Plate 24

Referring to FIGS. 3 and 5, the stripper plate 24, which is located between the core 13 and the movable die 23, comes into contact with the upper surface of the core 13 when the fixed die 22 and the movable die 23 are clamped. In this case, the position of the stripper plate 24 with respect to the post 30 of the intermediate plate 28 in the circumferential direction is fixed by respectively fitting the pins 31 into holes 33 that are included in the lower surface of the stripper plate 24.

The stripper plate 24 includes a first segment 34 and a second segment 35 that are divided in the vertical direction Z, which corresponds to the movement direction of the movable die 23. The stripper plate 24 further includes first biasing portions 36 that bias the first segment 34 and the second segment 35 to separate from each other in the vertical direction Z. The middle part of the upper surface of the second segment 35 includes a middle recess 37. The first segment 34 is located in the middle recess 37. When the first segment 34 is fully accommodated in the middle recess 37 of the second segment 35, that is, when the lower surface of the first segment 34 is in contact with the bottom surface of the middle recess 37, the upper surface of the second segment 35 is flush with the upper surface of the first segment 34.

The first biasing portions 36 are arranged at positions of the second segment 35 that correspond to a peripheral portion of the first segment 34. The first biasing portions 36 each include a case 38 that extends downward from the lower surface of the second segment 35 and a first coil spring 39 supported by the case 38. The lower end of the first coil spring 39 is in contact with the bottom surface of the case 38. The upper end of the first coil spring 39 is in contact with the bottom surface of a peripheral recess 40. The peripheral recess 40 is provided on the lower surface of the peripheral portion of the first segment 34.

The first coil springs 39 constantly bias the first segment 34 upward at the bottom surface of the peripheral recess 40. When the fixed die 22 and the movable die 23 are open, the first segment 34 is lifted from the bottom surface of the middle recess 37 of the second segment 35 by the biasing forces of the first coil springs 39. Support holes 41 and guide holes 42 are arranged at a peripheral portion of the second segment 35. The support holes 41 and guide holes 42 extend through the second segment 35 in the vertical direction Z. The support holes 41 are located inside the guide holes 42.

At the position of a peripheral portion of the lower surface of the movable die 23 corresponding to, in the vertical direction Z, each support hole 41 of the second segment 35, a support shaft 43 extends straight downward. The length of the support shaft 43 is greater than the thickness of the second segment 35. The support shaft 43 is inserted through the support hole 41 of the second segment 35 to be slidable in the support hole 41. The lower end of the support shaft 43 includes an enlarged diameter portion 44 that has a slightly larger diameter than the diameter of the support hole 41.

Due to its own weight, the stripper plate 24 is engaged with the enlarged diameter portions 44 on the lower surface of the second segment 35. The stripper plate 24 is supported such that, when the fixed die 22 and the movable die 23 are open, it is suspended from the movable die 23 by the support shafts 43. Since each support shaft 43 is inserted through a corresponding support hole 41 such that the support shaft 43 is slidable in the support hole 41, the stripper plate 24 is configured to move relative to the movable die 23 in the vertical direction Z.

At the position of the peripheral portion of the lower surface of the movable die 23 corresponding to, in the vertical direction Z, each guide hole 42 of the second segment 35, a guide shaft 45 extends straight downward. The length of the guide shaft 45 is approximately equal to the length of the support shaft 43. The guide shaft 45 is inserted through the guide hole 42 of the second segment 35 to be slidable in the guide hole 42. When the stripper plate 24 slides each support shaft 43 in a corresponding support hole 41, the stripper plate 24 slides each guide shaft 45 in a corresponding guide hole 42. This allows each guide shaft 45 to guide movement of the stripper plate 24 along a corresponding support shaft 43.

The stripper plate 24 defines a runner 46 and a gate 47. The runner 46 extends in the vertical direction Z, which corresponds to the movement direction of the movable die 23, and extends in the horizontal direction, which is orthogonal to the vertical direction Z. The runner 46 includes vertical runners 48 extending in the vertical direction Z and a horizontal runner 49 extending in the horizontal direction.

Figure 4:
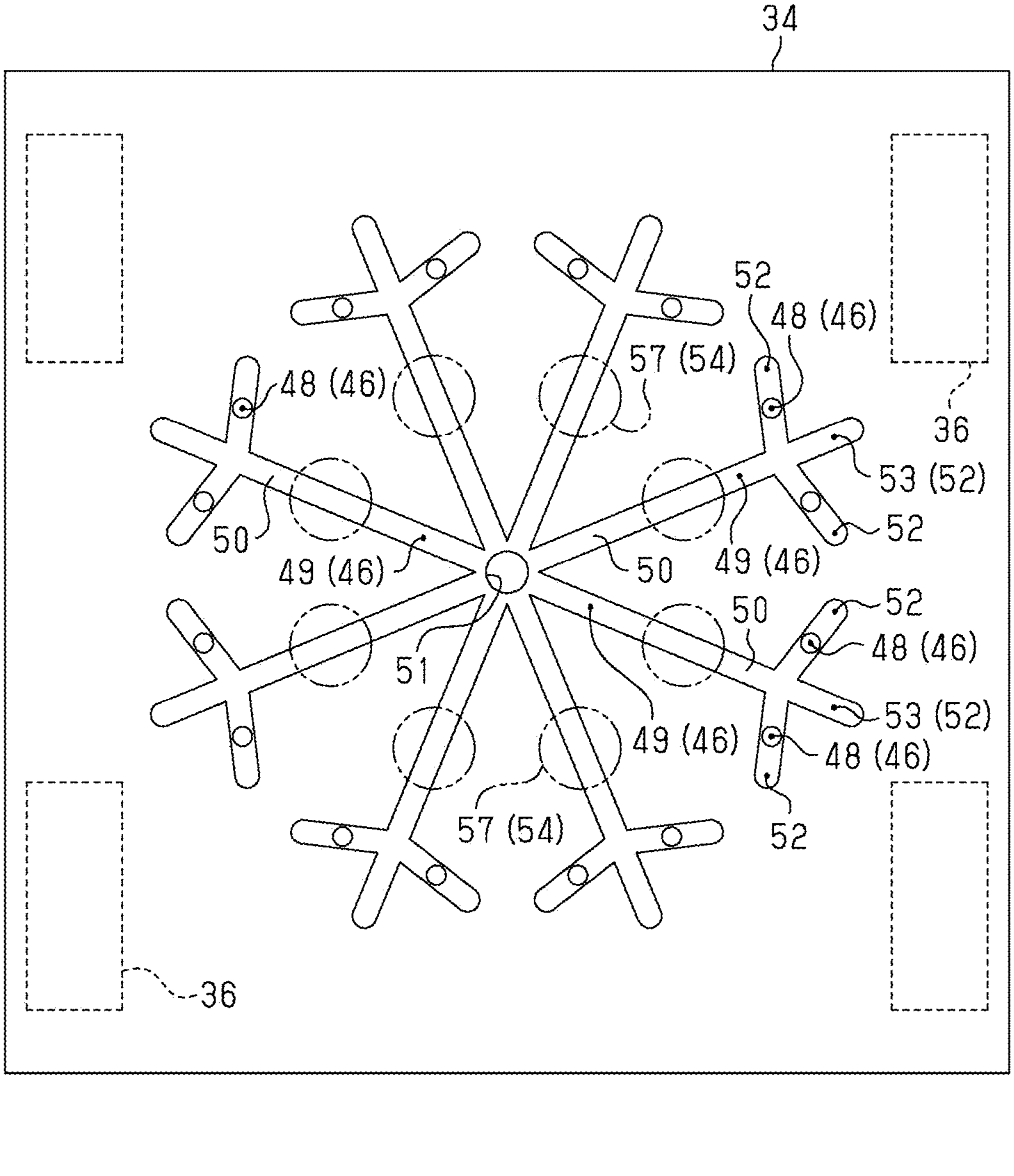
FIG. 4 is a plan view of the first segment.

As shown in FIGS. 3 to 5, the middle portion of the upper surface of the first segment 34 includes a groove 50 that extends radially in the horizontal direction from the center. When the upper surface of the first segment 34 comes into contact with the lower surface of the movable die 23, the first segment 34 defines the horizontal runner 49 together with the groove 50 and the lower surface of the movable die 23. In other words, the first segment 34, together with the movable die 23, defines the horizontal runner 49 extending radially from the center in the horizontal direction. A central resin reservoir 51 is recessed from the center of the groove 50, which extends radially, in the first segment 34. The resin materials 18 are accumulated in the central resin reservoir 51.

The horizontal runner 49 in the present embodiment branches into eight from the middle part of the upper surface of the first segment 34, extending radially outward at equal intervals in the circumferential direction. Each of the eight branched horizontal runners 49 further branches into three branch passages 52 at their tips. Of the three branch passages 52 into which the horizontal runner 49 is branched at its tip, the center branch passage 52 functions as a tip resin reservoir 53 in which the resin material 18 accumulates. The remaining two branch passages 52 are each connected to the upper end of a corresponding vertical runner 48.

The vertical runners respectively 48 extend from the branch passages 52 to the lower surface of the second segment 35. Each vertical runner 48 is tapered such that its diameter decreases downward. The lower end of each vertical runner 48 opens at the lower surface of the second segment 35, thereby defining a corresponding gate 47. Each vertical runner 48 is divided into two at the boundary between the lower surface of the first segment 34 and the bottom surface of the middle recess 37 of the second segment 35. Accordingly, the first segment 34 defines an upstream portion of each vertical runner 48, while the second segment 35 defines the gate 47 and a downstream portion of the vertical runner 48 other than the upstream portion.

At the position of the movable die 23 corresponding to, in the vertical direction Z, the portion including part of each of the eight radially branching horizontal runners 49 on the upper surface of the first segment 34, a second biasing portion 54 is disposed. Each second biasing portion 54 biases the upper surface of the first segment 34 downward, that is, toward the second segment 35 at a portion that includes part of the horizontal runner 49. The second biasing portion 54 produces a smaller biasing force than the first biasing portion 36.

The second biasing portion 54 includes an accommodating recess 55 that opens in the lower surface of the movable die 23, a second coil spring 56 accommodated in the accommodating recess 55, and a columnar block 57 accommodated in the accommodating recess 55 and fixed to the lower end of the second coil spring 56. The second coil spring 56 produces a smaller biasing force than the first coil spring 39. The second coil spring 56 has a smaller diameter than the block 57. The accommodating recess 55 includes a first accommodating section 58 and a second accommodating section 59, which is located below the first accommodating section 58.

The diameter of the first accommodating section 58 is smaller than the diameter of the second accommodating section 59. Accordingly, a stepped surface 60 is defined between the first accommodating section 58 and the second accommodating section 59. The second coil spring 56 is accommodated in the first accommodating section 58. The block 57 is accommodated in the second accommodating section 59. The upper end of the second coil spring 56 is fixed to the upper end of the first accommodating section 58.

When the fixed die 22 and the movable die 23 are open, each second coil spring 56 extends due to the weight of a corresponding block 57. As a result, the lower part of the block 57 protrudes downward from the accommodating recess 55. When the fixed die 22 and the movable die 23 are clamped, the block 57 is pushed up to the stripper plate 24, and the second coil spring 56 contracts. Thus, the upper surface of the block 57 comes into contact with the stepped surface 60, and the lower surface of the block 57 becomes flush with the lower surface of the movable die 23.

Method for Manufacturing Rotor 11

The method for manufacturing the rotor 11 will now be described as an operation of the embodiment. The method for manufacturing the rotor 11 includes a supporting step, a magnet accommodating step, a die clamping step, an injecting step, and a removing step.

Supporting Step

As shown in FIG. 3, in the supporting step, with the fixed die 22 and the movable die 23 open, the spacer 29 is first passed through the post 30 of the intermediate plate 28. Subsequently, the central hole 14 of the core 13 is passed through the post 30. As a result, the core 13 is supported by the intermediate plate 28 together with the spacer 29. The core 13, which is supported by the intermediate plate 28, is positioned on the fixed die 22. In other words, the core 13, which is supported by the intermediate plate 28, is positioned between the fixed die 22 and the stripper plate 24.

Magnet Accommodating Step

As shown in FIG. 3, in the magnet accommodating step, each magnet 17 is inserted from above into a corresponding magnet accommodating hole 15 of the core 13, which is supported together with the spacer 29 by the intermediate plate 28 in the supporting step. The number of the magnets 17 accommodated in one magnet accommodating hole 15 is typically one or two.

Die Clamping Step

Referring to FIG. 5, during the die clamping step, the movable die 23 is lowered from a predetermined die opening position that is illustrated in FIG. 3. Then, after the stripper plate 24 is placed on top of the core 13, the stripper plate 24 is pressed from above by the movable die 23. This causes the movable die 23 and the fixed die 22 to be clamped.

With the movable die 23 and the fixed die 22 clamped, the first segment 34 is pressed downward by the movable die 23 against the biasing force of each first coil spring 39 and is fully accommodated in the middle recess 37 of the second segment 35. That is, the lower surface of the first segment 34 comes into contact with the bottom surface of the middle recess 37.

In this state, the sprue 26 is connected to the horizontal runner 49. Further, each vertical runner 48, which has been divided into two at the boundary between the lower surface of the first segment 34 and the bottom surface of the middle recess 37 of the second segment 35, is reconnected. The vertical runners 48 are respectively connected to the magnet accommodating holes 15 of the core 13 at the gates 47.

Additionally, as shown in FIGS. 4 and 5, when the movable die 23 and the fixed die 22 are clamped, the stripper plate 24 pushes the blocks 57 upward against the biasing forces of the second coil springs 56. This brings the upper surface of block 57 into contact with the stepped surface 60. Further, with the lower surfaces of the blocks 57 flush with the lower surface of the movable die 23, the lower surfaces of the blocks 57 come into contact with a portion of the upper surface of the first segment 34 including part of the horizontal runner 49.

Injecting Step

As shown in FIG. 5, in the injecting step, molten resin materials 18 are supplied to the sprue 26 from the cylinder 25. Then, the molten resin materials 18 sequentially flow through the sprue 26, the horizontal runner 49, and the vertical runners 48. Subsequently, they are respectively injected and filled into the magnet accommodating holes 15 through the gates 47.

Afterward, the resin materials 18 respectively filled in the magnet accommodating holes 15 cool and solidify, thereby fixing the magnets 17 in the magnet accommodating holes 15. Thus, the rotor 11 shown in FIGS. 1 and 2 is manufactured. In this case, the resin materials 18 remaining in the sprue 26, the horizontal runner 49, and the vertical runners 48 also solidify.

Extracting Step

Figure 6:
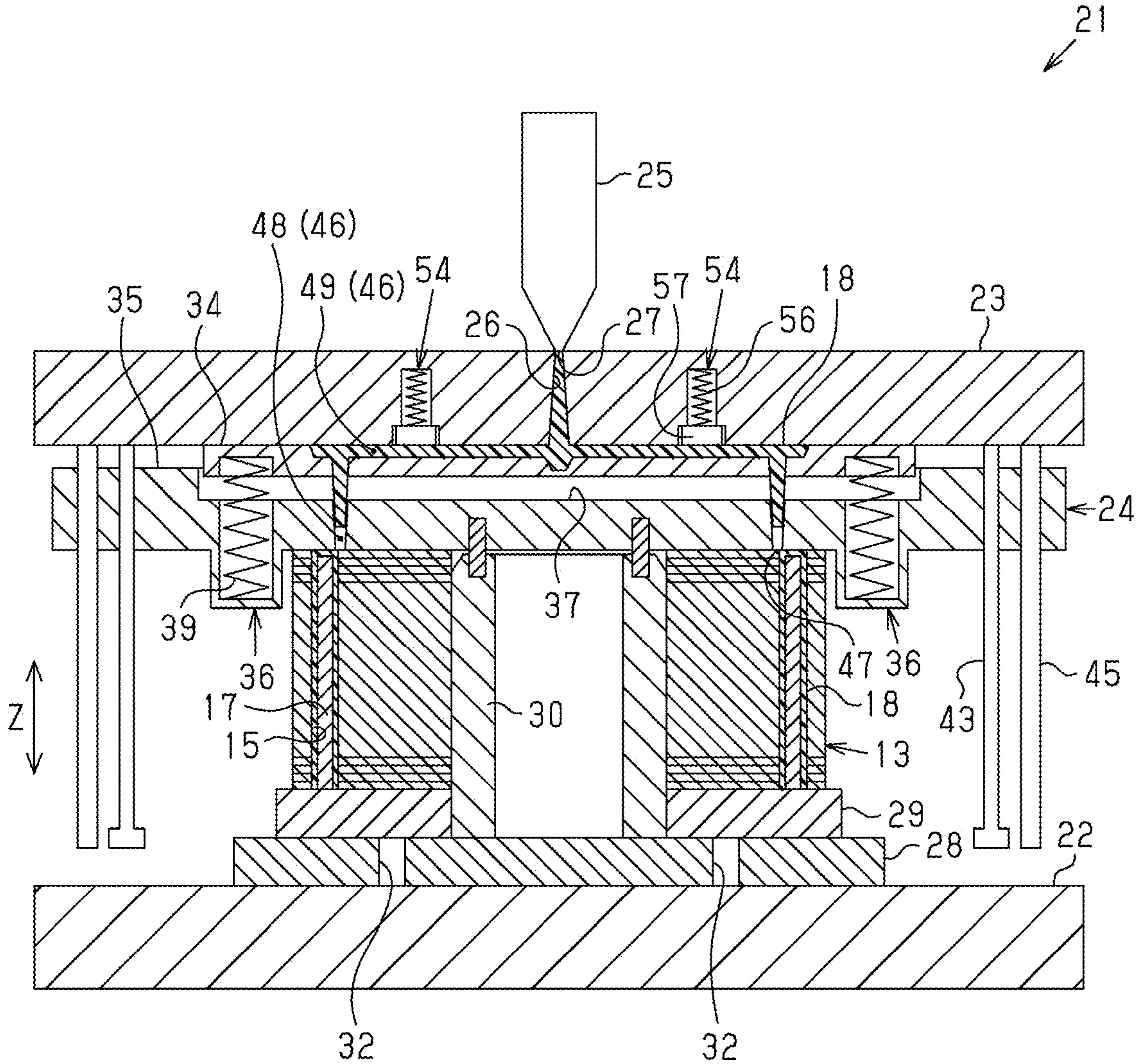
FIG. 6 is a cross-sectional view showing a state in which the movable die in FIG. 5 is raised.

As shown in FIG. 6, in the extracting step, the fixed die 22 and the movable die 23 are first opened by raising the movable die 23 to pull the rotor 11 out of the manufacturing apparatus 21. When the movable die 23 is raised, the downward pressing force on the first segment 34 exerted by the movable die 23 is eliminated. As a result, the biasing forces of the first coil springs 39 cause the first segment 34 to lift from the bottom surface of the middle recess 37 of the second segment 35.

In this state, the biasing forces of the second coil springs 56 act on the first segment 34 in the direction opposite to the biasing forces of the first coil springs 39. However, the biasing forces of the second coil springs 56 are smaller than the biasing forces of the first coil springs 39. Thus, the biasing forces of the second coil springs 56 do not prevent the biasing forces of the first coil springs 39 from lifting the first segment 34 from the bottom surface of the middle recess 37 of the second segment 35.

Furthermore, the second segment 35 receives a reaction force that occurs when the first coil springs 39 lift the first segment 34 with their biasing forces. This prevents the second segment 35 from being raised following the movable die 23.

Then, the biasing forces of the first coil springs 39 lift the first segment 34 from the bottom surface of the middle recess 37 of the second segment 35. As a result, the resin materials 18 respectively solidified in the vertical runners 48 and gates 47 of the second segment 35 are pulled upward by the first segment 34 via the resin materials 18 solidified in the horizontal runner 49 and vertical runners 48 of the first segment 34. Consequently, the solidified resin materials 18 in the vertical runners 48 and the gates 47 of the second segment 35 are sheared at the narrowest parts of the gates 47. Thus, excess resin materials 18 connected to the rotor 11 are removed.

Figure 7:
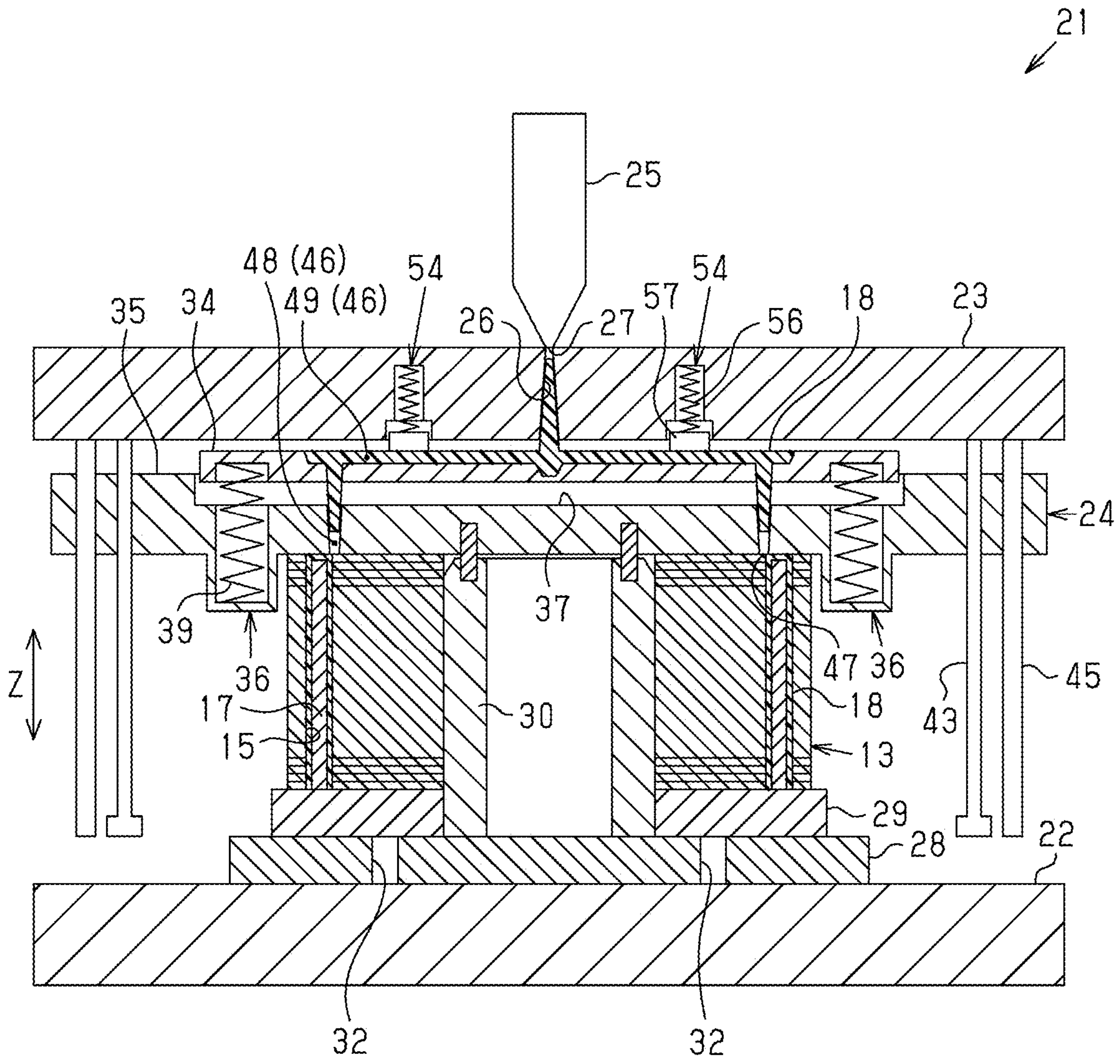
FIG. 7 is a cross-sectional view showing a state in which the movable die in FIG. 6 is further raised.

As shown in FIGS. 4 and 7, when the movable die 23 is further raised, the first segment 34 is biased downward in a direction opposite to the movement direction of the movable die 23 by the second biasing portions 54, together with the resin materials 18 solidified in the horizontal runners 49 of the first segment 34. As a result, the resin materials 18 solidified in the sprue 26 are sheared at the narrowest part of the sprue 26 where the nozzle 27 is connected to the cylinder 25.

Figure 8:
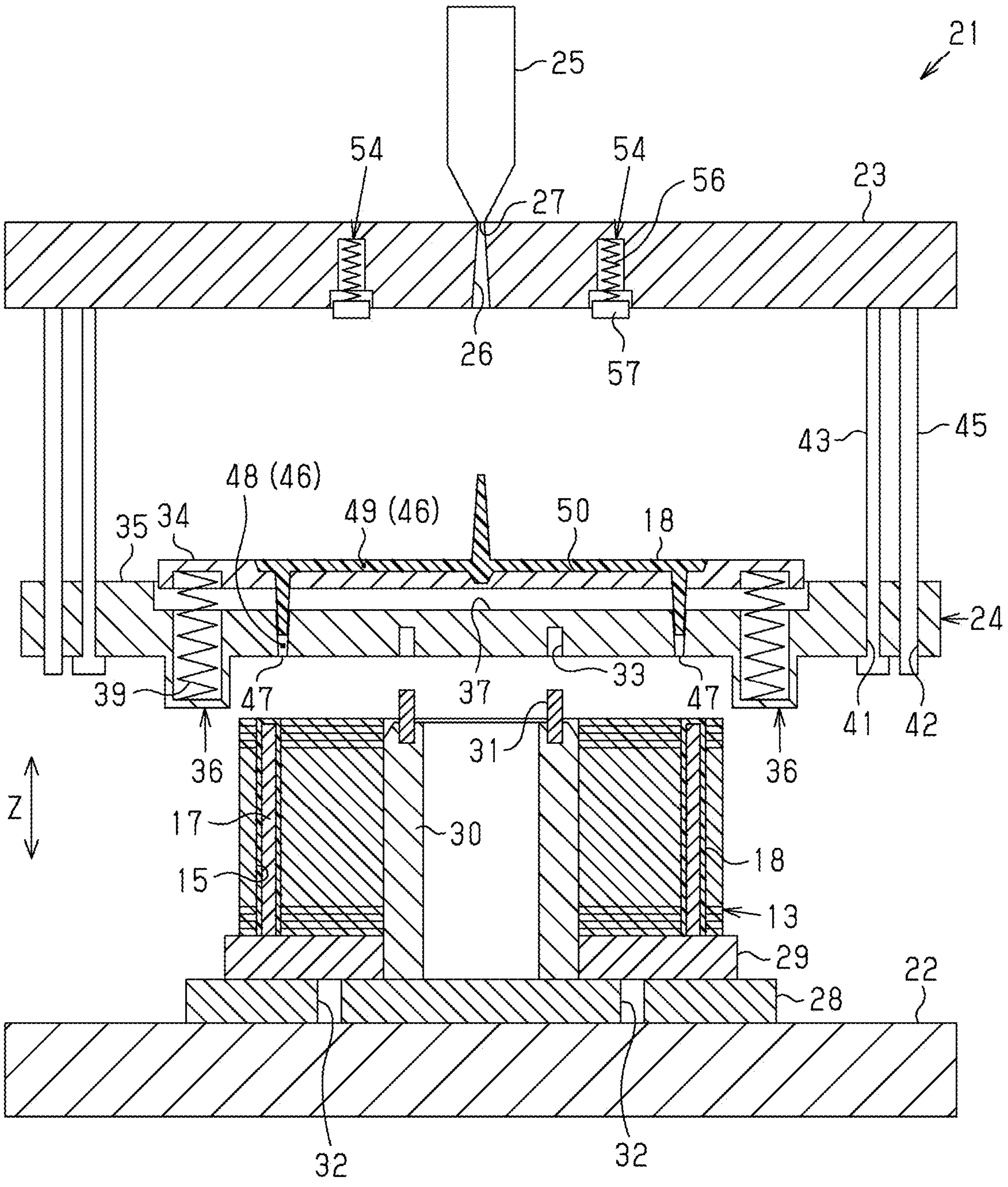
FIG. 8 is a cross-sectional view showing a state in which the movable die in FIG. 7 is raised to a predetermined open position.

As shown in FIG. 8, when the movable die 23 is further raised, the stripper plate 24 also rises together with the movable die 23, with the stripper plate 24 suspended from the movable die 23 by the support shafts 43. In this state, excess resin materials 18 solidified in the sprue 26 and runners 46 remain on the stripper plate 24. When the movable die 23 is raised to the predetermined die opening position, the stripper plate 24 is positioned above the core 13, while being separated from the core 13.

The excess resin materials 18 remaining on the stripper plate 24 are slightly lifted from the vertical runners 48 of the second segment 35. Thus, the adhesion of the excess resin materials 18 to the wall surfaces of the vertical runners 48 of the second segment 35 is practically eliminated. Thus, the excess resin materials 18 remaining on the stripper plate 24 are readily grasped and removed by, for instance, a robotic arm. The remaining resin materials 18 removed from the stripper plate 24 are recycled.

Then, the rotor 11 that is supported by the intermediate plate 28 is pulled out of the section between the fixed die 22 and the stripper plate 24. Subsequently, only the rotor 11 is extracted and detached from the post 30 of the intermediate plate 28. As a result, the rotor 11 shown in FIGS. 1 and 2 is obtained.

Advantages of Embodiment

The embodiment described above in detail has the following advantages.

(1) The manufacturing apparatus 21 for the rotor 11 includes the fixed die 22, the movable die 23, which faces the fixed die 22 and includes the sprue 26, and the stripper plate 24, which is arranged between the movable die 23 and the fixed die 22 and is configured to move relative to the movable die 23. The stripper plate 24 defines the runners 46 and the gates 47. The runners 46 extend in the movement direction of the movable die 23 and in the direction that is orthogonal to the movement direction. The manufacturing apparatus 21 for the rotor 11 is configured to manufacture the rotor 11 by filling each magnet accommodating hole 15 with a corresponding resin material 18 to fix the magnet 17, in a state in which the fixed die 22 and the movable die 23 are clamped such that the core 13 in which the magnet accommodating hole 15 accommodates the magnet 17 is held between the fixed die 22 and the stripper plate 24. The stripper plate 24 includes the first segment 34 and the second segment 35, which are divided in the movement direction, and the first biasing portions 36, which bias the first segment 34 and the second segment 35 such that they are separated from each other in the movement direction. The first segment 34, together with the movable die 23, defines the runners 46. The second segment 35 defines the runners 46 and gates 47.

In the above configuration, the magnets 17 are fixed by respectively filling the magnet accommodating holes 15 of the core 13 with the resin materials 18. Then, the movable die 23 is moved away from the fixed die 22 so that the fixed die 22 and the movable die 23 open. Consequently, the first segment 34 is moved away from the second segment 35 by the biasing forces of the first biasing portions 36. As a result, the resin materials 18 solidified in the runners 46 and gates 47 of the second segment 35 are pulled by the first segment 34 via the resin materials 18 solidified in the runners 46 of the first segment 34. This causes the resin materials 18 solidified in the runners 46 and gates 47 of the second segment 35 to be sheared at parts of the gates 47. This allows for the removal of excess resin materials 18 from the rotor 11 without the need for any dedicated equipment.

(2) In the manufacturing apparatus 21 for the rotor 11, the movable die 23 includes the second biasing portions 54, which bias the first segment 34 toward the second segment 35 at portions including the runners 46. The second biasing portion 54 produces a smaller biasing force than the first biasing portion 36.

In the above configuration, the magnets 17 are fixed by respectively filling the magnet accommodating holes 15 of the core 13 with the resin materials 18. Then, the movable die 23 is moved away from the fixed die 22 so that the fixed die 22 and the movable die 23 open. Consequently, the first segment 34, as well as the resin materials 18 solidified in the runners 46 of the first segment 34, are biased in the direction opposite to the movement direction of the movable die 23 by the second biasing portions 54. As a result, the resin materials 18 solidified in the sprue 26 of the movable die 23 are sheared at the upstream ends of the resin materials 18 in the sprue 26. This allows the resin materials 18 solidified in the sprue 26 of the movable die 23 to be cut simply by opening the fixed die 22 and the movable die 23.

Modifications

The above embodiments may be modified as follows. The above embodiment and the following modifications can be combined as long as the combined modifications remain technically consistent with each other.

To open the fixed die 22 and the movable die 23 by raising the movable die 23 after manufacturing the rotor 11, a biasing member may be disposed on the movable die 23 to prevent the second segment 35 from rising following the movable die 23.

The second biasing portions 54 may be omitted.

The biasing forces of the second biasing portions 54 may be greater than or equal to the biasing forces of the first biasing portions 36.

The armature is not limited to the rotor 11 but may also be a stator.

The manufacturing apparatus for the armature may also be employed in the manufacturing apparatus for the stator.

What is claimed is:

1. A manufacturing apparatus for an armature, the manufacturing apparatus comprising:

a fixed die;

a movable die that opposes the fixed die and includes a sprue; and a stripper plate located between the movable die and the fixed die and configured to move relative to the movable die, the stripper plate defining a runner and a gate, and the runner extending in a movement direction of the movable die and extending in a direction that is orthogonal to the movement direction, wherein the manufacturing apparatus for the armature is configured to manufacture the armature by filling a magnet accommodating hole with a resin material to fix a magnet, in a state in which the fixed die and the movable die are clamped such that a core in which the magnet accommodating hole accommodates the magnet is held between the fixed die and the stripper plate, the stripper plate includes:

a first segment and a second segment that are divided in the movement direction; and a first biasing portion that biases the first segment and the second segment to move away from each other in the movement direction, the first segment defines the runner together with the movable die, and the second segment defines the runner and the gate.

2. The manufacturing apparatus for the armature according to claim 1, wherein the movable die includes a second biasing portion that biases the first segment toward the second segment at a portion including the runner, and the second biasing portion produces a smaller biasing force than the first biasing portion.

3. The manufacturing apparatus for the armature according to claim 1, wherein the first segment includes an opposing surface that faces the second segment in the movement direction, the second segment includes an opposing surface that faces the first segment in the movement direction, the runner is divided at a boundary between the opposing surface of the first segment and the opposing surface of the second segment, and the first biasing portion biases the first segment and the second segment such that the opposing surface of the first segment and the opposing surface of the second segment move away from each other in the movement direction.

4. The manufacturing apparatus for the armature according to claim 3, wherein the second segment includes a recess, the opposing surface of the second segment defines a bottom surface of the recess, the first segment is located in the recess, and the first biasing portion is arranged at a position of the second segment that corresponds to a peripheral portion of the first segment.

5. The manufacturing apparatus for the armature according to claim 1, wherein the movable die includes a second biasing portion, the first segment includes an opposing surface that faces the movable die in the movement direction, the opposing surface includes a groove that forms a part of the runner, the groove having an opening that opens toward the movable die, and the second biasing portion is configured to bias the first segment toward the second segment by contacting the opposing surface of the first segment while spanning the opening of the groove.

6. The manufacturing apparatus for the armature according to claim 5, wherein the second biasing portion produces a smaller biasing force than the first biasing portion.

* * * * *